United States Patent [19]

Stettmaier

[11] 4,308,590

[45] Dec. 29, 1981

[54] METHOD AND APPARATUS FOR MODIFYING ADDRESSES FOR THE MEMORY CONTROL OF A ONE-CHIP MICROCOMPUTER HAVING AN EXTERNALLY EXPANDABLE MEMORY

[75] Inventor: Helmut Stettmaier, Olching, Fed. Rep. of Germany

[73] Assignee: Siemens Aktiengesellschaft, Berlin & Munich, Fed. Rep. of Germany

[21] Appl. No.: 22,702

[22] Filed: Mar. 22, 1979

[30] Foreign Application Priority Data

Mar. 29, 1978 [DE] Fed. Rep. of Germany ....... 2813542

[51] Int. Cl.$^3$ .............................................. G06F 13/00
[52] U.S. Cl. .................................................. 364/900
[58] Field of Search ........ 364/200, 900, 200 MS File, 364/900 MS File

[56] References Cited

U.S. PATENT DOCUMENTS

| 3,299,261 | 1/1967 | Steigerwalt | 364/900 |
| 3,949,378 | 4/1976 | Crabb et al. | 364/200 |
| 4,001,786 | 1/1977 | Boehm | 364/200 |
| 4,056,819 | 11/1977 | Lukas | 364/200 |

FOREIGN PATENT DOCUMENTS

2654278 7/1977 Fed. Rep. of Germany .

*Primary Examiner*—Gareth D. Shaw
*Assistant Examiner*—David Y. Eng
*Attorney, Agent, or Firm*—Hill, Van Santen, Steadman, Chiara & Simpson

[57] ABSTRACT

A method and an arrangement are disclosed for modifying the addresses of a memory control of a one-chip microcomputer which has an external memory. The address range of the external memory with address values above the address values of the address range for an internal memory is transformed into a value range of $0-2^m$, whereby m equals the plurality of connections at the microcomputer by way of which the addresses are output to the external memory.

2 Claims, 2 Drawing Figures

METHOD AND APPARATUS FOR MODIFYING ADDRESSES FOR THE MEMORY CONTROL OF A ONE-CHIP MICROCOMPUTER HAVING AN EXTERNALLY EXPANDABLE MEMORY

BACKGROUND OF THE INVENTION

1. Field of the Invention

The present invention relates to a method and to an apparatus for modifying addresses of a memory control of a one-chip microcomputer having an external expandable memory, whereby an internal memory having a storage capacity of n binary words is provided in the microcomputer, and whereby the addressing of the external memory is carried out by way of a predetermined plurality m of connections at the microcomputer, and whereby the microcomputer delivers the addresses, both for the internal memory and the external memory, successively, beginning from a smallest address value, and whereby a transfer from the addressing of the internal memory to the addressing of the external memory follows in the microcomputer for addresses beyond the address range for the internal memory.

2. Description of the Prior Art

In one-chip microcomputers, further components, in particular a program memory, are also integrated in a semiconductor chip, in addition to the central processor (microprocessor). It has also become known from the German published application No. 2,654,278 to expand the storage capacity in one-chip microcomputers by means of a memory that can be externally connected to the microcomputer. With this arrangement, for addressing of the memory, a possibility is provided for transferring, during addressing, from the internal (co-integrated) memory to the external memory. A specific plurality of externally accessible connections is required in the microcomputer for the addressing of the external memory, as well as for data traffic.

In integrated circuits, the expense for housing of the components, including the connections leading to the exterior of the device, generally represents a significant factor which must be taken into consideration in comparison to the expense for the circuit system, i.e. the circuit without the electrical connections leading to the outside and without housing. Within the conception of integrated circuits, therefore, one generally endeavors to keep the number of connections on the housing, and thus the expense for the housing, as low as possible. Particularly in microprocessors, and in microcomputers, it can therefore be expedient to undertake additional circuit technical expense in the circuit system in order to eliminate connections on the housing, since additional circuit components in the circuit are of relatively less consequence, in comparison to additional connections on the housing.

In a one-chip microcomputer having externally expandable memory capacity, therefore, the memory capacity of the external memory and, therefore, the total memory capacity realizable by means of the internal and external memories is limited by the number of connections on the housing which one wishes to allow in toto for the address and data traffic between the microcomputer and the external memory.

In a one-chip microcomputer, according to the aforementioned German published application No. 2,654,278, the arrangement is specifically laid out in such a manner that a 1 Kbyte read only memory (ROM) is located on the microcomputer chip and is externally expandable to a maximum of 4 Kbytes. Further, the arrangement is laid out in such a manner that, given a value range of 1-1023 for the internal memory, addresses which exceed the value of 1023 are delivered, essentially unaltered, to the external memory via 12 externally accessible connections on the microcomputer.

If one proceeds generally from the fact that the internal memory has a memory capacity of n words and that m connections for addressing the external memory are available at the microcomputer, then a total of $2^m$ words can be addressed in the type of addressing mentioned above for the total memory formed of the internal and external memories in the known microcomputer. The usable memory capacity of the external memory which is available is directly connected with the plurality of connections on the microcomputer and can be expanded only by increasing the plurality of such connections.

SUMMARY OF THE INVENTION

The object of the present invention, therefore, is to provide a greater external memory expansion capability having a predetermined plurality of externally accessible connections on the microcomputer.

The foregoing object is achieved, in accordance with the present invention, in a method of the type initially mentioned above, in general terms, in that the address range for the external memory having address values above the address values of the address range for the internal memory is transformed into a value range from the smallest occurrent address value through $2^m$, whereby m equals a plurality of connections on the microcomputer by way of which the addresses are delivered to the external memory.

Thereby, according to particular embodiments of the invention, the transformation of the address range of the external memory is possible in two ways:

1. On the one hand, the value n can be subtracted from the addresses generated in the microcomputer with values above the address range of the addresses for the internal memory before their output to the external memory, whereby n equals the number of the addresses of the value range of the addresses for the internal memory beginning with the smallest occurrent address value; and
2. On the other hand, addresses generated in the microcomputer with values in the range of $n-2^m-1$ can be delivered without change to the external memory and addresses with values greater than $2^m-1$ can be delivered after subtraction of the value $2^m$, whereby n equals the number of addresses of the value range of the addresses for the internal memory, beginning with the smallest occurrent address value, and m equals the plurality of the connections on the microcomputer by way of which the addresses are delivered to the external memory.

In a further development of the invention, and arrangement for the implementation of the method in which the value n is subtracted from the addresses generated in the microcomputer with values above the value range of the addresses for the internal memory is characterized by means of the following features:

1. A gate is provided in the microcomputer and has two inputs for the two highest value bits of the addresses generated in the microcomputer, in which the two inputs for the two highest value bits respectively lie at an input of an EXCLUSIVE NOR gate; and in which 2. The input for the bit with the second highest significance is coupled by way of an inverter to an output for the delivery of an address bit to the external memory, and the output of the EXCLUSIVE NOR gate serves for the delivery of a transfer signal for a change-over between an addressing of the internal memory and an addressing of the external memory.

An arrangement for implementing the method of the present invention in which the address is generated in the microcomputer with values in the range of $n-2^m-1$ are delivered without change to the external memory and addresses having values larger than $2^m-1$ are delivered, after subtraction of the value $2^m$, is characterized by the following features in a further embodiment of the invention:

1. A gate circuit is provided in the microcomputer having two inputs for the two most significant bits of the address generated in the microcomputer, the two inputs for the two most significant bits respectively lie at an input of an EXCLUSIVE NOR gate; and in which
2. The input for the bit with the second highest significance is directly connected to an output for the delivery of an address bit to the external memory, and the input of the EXCLUSIVE NOR gate serves for the delivery of a transfer signal for a change-over between an addressing of an internal memory and an addressing of the external memory.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
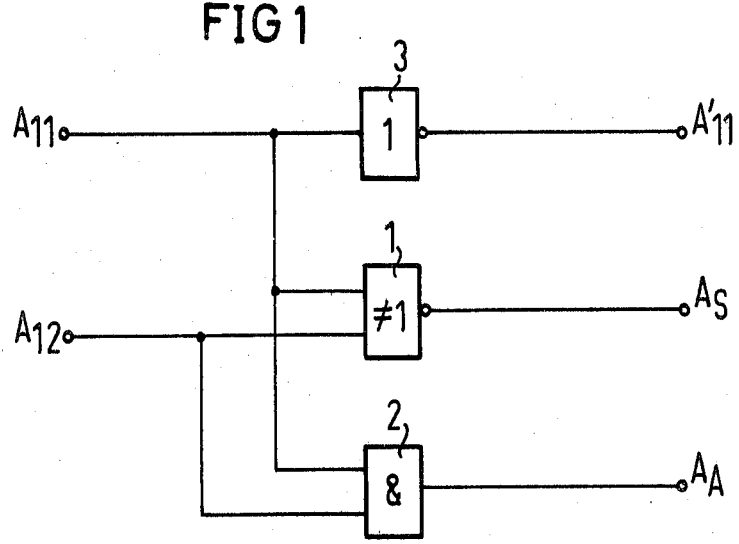
FIG. 1 illustrates a gate circuit for accomplishing the transformation of the address range for the external memory.

The following discussions are based on the assumption that an internal memory having a memory capacity of 2 Kbyte is available in a one-chip microcomputer. Therefore, n=2048 binary words can be stored in the internal memory. Further, m=12 externally accessible connections are available at the microcomputer for addressing an external memory. The numbers 0–4095 can be binarily output by way of these 12 connections, i.e. an external 4K memory can be addressed. For the sake of a memory organization which is clear for a programmer, the address range 0–2047 is allocated to the internal memory. In order to avoid address gaps, the address range for the external memory must then lie between the address values 2048–6143. The address range for the external memory, therefore, lies outside of the address range for the internal memory.

An internal 2K memory and an external 4K memory yield a 6K total memory capacity, for which an address register having 13 bit length is required.

The method of the present invention is based on the concept of transforming those addresses which are to be output to the external memory in such a manner that they fit into the interval of 0–4095 which can be governed with the 12 externally accessible connections at the microcomputer. The transformation can follow in two ways.

First, the constant value 2048 can be subtracted from the address value in the address register of the microcomputer for all values which are larger than 2047 and the difference can be fed to the external memory. In so doing, the interval 2048–6143 is transformed into the interval 0–4095, so that the address range controllable with the 12 externally accessible connections at the microcomputer is produced for the external memory. This subtraction works out particularly simply for the following reasons.

The total occurring address values from 0–6143 can be represented by means of 13 bit positions which are to be designated with $A_0$–$A_{12}$. Let the addresses to be delivered to the external memory be designated with $A'_0$–$A'_{11}$. Since the fixed value $2048=2^{12}$ to be subtracted has a 1 in binary representation only in its bit position $A_{11}$ and has a respective 0 in its lower-order bit positions $A_0$–$A_{10}$, only the two most significant bit positions $A_{11}$ and $A_{12}$ of the addresses generated in the microcomputer are affected by the substraction, whereas all other bit positions $A_0$–$A_{10}$ experience no change by the subtraction of a 0. These circumstances are illustrated in Table I set forth below.

TABLE I

| Addresses Generated in the Microcomputer | | | | Addresses to be delivered after subtraction of $2048 = 2^{12}$ | | | |
|---|---|---|---|---|---|---|---|
| $A_{12}$ | $A_{11}$ | $A_{10}$ | ...$A_0$ | $(A'_{12})$ | $A'_{11}$ | $A'_{10}$ | ...$A'_0$ |
| 0 | 0 | X | ...X | — | — | — | ...— * |
| 0 | 1 | X | ...X | (0) | 0 | X | ...X ** |
| 1 | 0 | X | ...X | (0) | 1 | X | ...X ** |

\* = no output, since it belongs to the internal memory
\*\* = to be delivered to the external memory It can be seen from Table I that address values according to the line 1 with a 0 in the bit positions $A_{11}$ and $A_{12}$ lie in the value range of 0–2047 and are thus not output, because they are allocated to the internal memory. With this concept, there is also no subtraction of the constant value 2048. Address values having a 1 in the bit position $A_{11}$ or, respectively, $A_{12}$ are larger than 2047, so that the constant value 2048 is subtracted from these address values. The address values in the column for the addresses to be output followed by means of the subtraction, whereby a 1 can arise only in the bit position $A'_{11}$. A 0 is always produced in the bit position $A'_{12}$ of the address to be output, so that an externally accessible connection at the microcomputer allocated to this bit position can be omitted.

The transformation set forth above can be realized, in the manner of circuit expense, by means of a gate circuit according to FIG. 1. Since, as indicated above, the bit positions $A_0$–$A_{10}$ remain unaffected during the aforementioned subtraction process, these bit values generated in the microcomputer can be output directly by way of externally accessible connections. Since these circumstances are conventional, the corresponding connections are not illustrated in FIG. 1. The values for the bit positions $A_{11}$ and $A_{12}$ are supplied to the gate circuit illustrated on the drawing at the connections $A_{11}$ and $A_{12}$. Since, according to lines 2 and 3 of Table I, the value in the bit position $A_{11}$ is inverted because of the subtraction of the value 2048, an inverter 3 is provided in the gate circuit according to FIG. 1 between the input $A_{11}$ and the output $A'_{11}$ which is the same as the externally accessible connection of the microcomputer for the bit position $A'_{11}$ of the address to be output. Further, the inputs $A_{11}$ and $A_{12}$ are respectively fed to an input of an EXCLUSIVE NOR gate 1 whose output $A_S$ serves for the delivery of a switching signal by means of which a transfer from the addressing of the internal memory in the microcomputer to the addressing of the external memory takes place. According to line 1 of Table 1, the bit positions $A_{11}$ and $A_{12}$ equal 0 for addresses with values from 0–2047. For this case, the EXCLUSIVE NOR gate 1 delivers the value 1 at its output $A_S$, by means of which the connection is made for addressing the internal memory in the microcomputer.

For address values generated in the microcomputer which are larger than 2047, according to lines 2 and 3 of Table I, a 1 always stands in the bit position $A_{11}$ or in the bit position $A_{12}$ for the address generated in the microcomputer, whereas a 0 always stands in the other bit positions. Therefore, the value 0 is always delivered at the output $A_S$ of the EXCLUSIVE NOR gate 1 by means of which (0) the microcomputer is transferred to a mode of operation wherein the external memory is addressed.

For that case in which the address generated in the microcomputer both bit positions $A_{11}$ and $A_{12}$ should both equally become 1, whereby an address beyond the allowable address range would exist, the inputs $A_{11}$ and $A_{12}$ in the gate circuit according to FIG. 1 can be fed to an additional AND gate 2 at whose output $A_A$ an alarm signal with the value 1 would then occur by means of which this unallowable state could be suppressed. Since this circumstance, however, is not of primary significance to the present invention, there shall be no more detailed discussion of a suppression of such an unallowable state.

The second possibility for the transformation of the address range for the external memory is that, for address values generated in the microcomputer which are larger than 4095, the value of the bit position $A_{12}$ which is then equal to 1 is suppressed and the remainder is output as the external address. If, on the other hand, the value of the address generated in the microcomputer lies between 2048 and 4095, then it is possible, without change, as the address for the external memory. This circumstance is illustrated in the following TABLE II, which corresponds to TABLE I.

TABLE II

| Addresses generated in the microcomputer | | | | Addresses to be output with suppression of $A_{12}$ for addresses greater than 4095 | | | |
|---|---|---|---|---|---|---|---|
| $A_{12}$ | $A_{11}$ | $A_{10}$ | ....$A_0$ | $A'_{11}$ | $A'_{10}$ | ....$A_0$ | |
| 0 | 0 | X | ....X | — | — | ....— | * |
| 0 | 1 | X | ....X | 1 | X | ....X | ** |
| 1 | 0 | X | ....X | 0 | X | ....X | ** |

\* = no output since it belongs to the internal memory
\*\* = to be output to the external memory.

It can no longer be seen from this table that there is again no output for address values which lie in the range from 0–2047, because this address range is assigned to the internal memory in the microcomputer. It can be seen from lines 2 and 3 of Table II that the bit position $A_{12}$ in the addresses generated in the microcomputer are not considered in the addresses to be output to the external memory and that only the bit position $A_{11}$ in the addresses generated in the microcomputer occurs with the same value in the corresponding bit position of the address to be delivered to the external memory.

Figure 2:
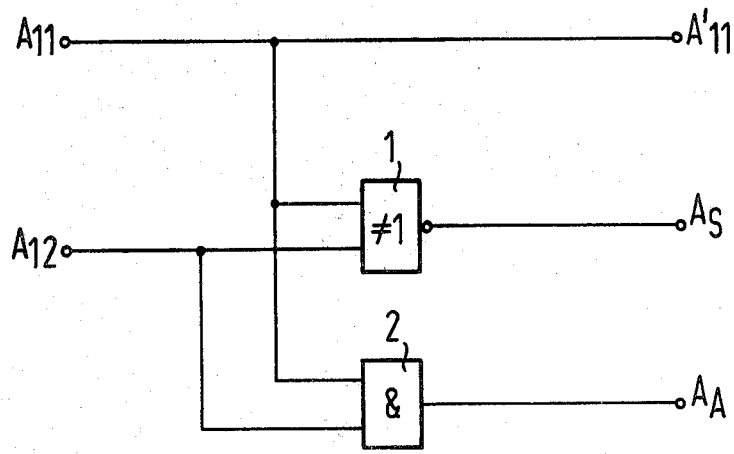
FIG. 2 illustrates a gate circuit for a further possibility of the transformation of the address range for the external memory.

This circumstance can be realized by means of a gate circuit constructed in accordance with FIG. 2, whereby the elements in FIG. 2 which are the same as the elements in the gate circuit of FIG. 1 are provided with the same reference characters. A gate circuit constructed in accordance with FIG. 2 is different from the gate circuit constructed in accordance with FIG. 1 only in that the inverter 3 in the line between the input $A_{11}$ and the output $A'_{11}$ is omitted, i.e. the value of the bit position $A_{11}$ in the addresses generated in the microcomputer is directly delivered to the externally accessible connection $A'_{11}$ for delivery to the external memory. The bit position $A_{12}$ in the addresses generated in the microcomputer is not considered for the output and is exploited solely for generating the transfer signal at the output $A_S$ of the EXCLUSIVE NOR gate 1 for transferring from the addressing of the internal memory to addressing of the external memory in the manner set forth above for the gate circuit constructed in accordance with FIG. 1.

From the foregoing discussions it can be seen that, in general, with an external memory in the microcomputer having a storage capacity of n words (bytes) and m available connections at the microcomputer for addressing an external memory, $2^m$ words are addressable in the external memory and, therefore, a total memory having $2^m + n$ words formed from the internal and external memory. In contrast to the initiallymentioned, known one-chip microcomputers, such as those set forth in the German published application No. 2,654,278, in which addresses which are larger than the addresses of the value range assigned to the internal memory are delivered unchanged to the external memory, so that only $2^m$ words are addressable for the total memory formed from the internal and external memories, by means of the present invention, both the method and the apparatus, the memory capacity of the total memory formed of the internal and external memories can therefore be enlarged by the value n. Given the same plurality of connections available for the addressing of the external memory, according to the present invention, therefore, the total addressable memory capacity can be increased with the same plurality of externally accessible connections for addressing the external memory.

Although I have discussed my invention by reference to particular illustrative embodiments thereof, many changes and modifications thereof may become apparent to those skilled in the art without departing from the spirit and scope of the invention. I therefore intend to include within the patent warranted hereon all such changes and modifications as may reasonably and properly be included within the scope of my contribution to the art.

I claim:

1. In an apparatus for modifying addresses for the memory control of a one-chip microcomputer having an external expandable memory and an internal memory with a storage capacity of n binary words, in which addressing of the external memory is carried out via a predetermined plurality of m connections to the microcomputer, in which the microcomputer delivers the addresses for both the internal and external memories counting successively from the smallest address value, and in which the microcomputer includes transfer means for transferring between addressing of the internal and external memories for addresses beyond the address range of the internal memory, the improvement comprising:

transforming means in the microcomputer for transforming address values above the address range of the internal memory into a value from the smallest occurrent address up to $2^m$, where m equals the plurality of connections between the microcomputer and the external memory, said transforming means comprising:

gate means in the microcomputer including a plurality of gate inputs and a plurality of gate outputs, said plurality of gate inputs adapted to receive the two most significant bits of an address, said gate means further including an EXCLUSIVE-NOR gate connected to said gate inputs and providing one of said gate outputs, and an inverter including an input connected to the gate input which receives the second most significant bit and providing another of said gate outputs, said EXCLUSIVE-NOR gate outputs serving as a transfer signal output for the transfer means.

2. The improved apparatus of claim 1, wherein:

said gate inputs include first and second gate inputs which are adapted to receive the first and second most significant bits, and said EXCLUSIVE-NOR gate includes two inputs connected to said first and second gate inputs, respectively.

* * * * *